(12) United States Patent
Bervoets et al.

(10) Patent No.: US 11,073,660 B2
(45) Date of Patent: Jul. 27, 2021

(54) HEAT TREATMENT OF FIBER TO IMPROVE CLEAVING

(71) Applicant: COMMSCOPE CONNECTIVITY BELGIUM BVBA, Kessel-Lo (BE)

(72) Inventors: Marc Eugène Willem Bervoets, Hasselt (BE); Jozef Christiaan Mathieu Versleegers, Pree (BE); Marc M. Vanbergen, Kampenhout (BE); Alfons Rudi Hermans, Sint-Truiden (BE); Heidi Kemps, Scherpenheuvel (BE); Stefano Beri, Brussels (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 0 days.

(21) Appl. No.: 16/647,411

(22) PCT Filed: Sep. 14, 2018

(86) PCT No.: PCT/EP2018/074952
§ 371 (c)(1),
(2) Date: Mar. 13, 2020

(87) PCT Pub. No.: WO2019/053217
PCT Pub. Date: Mar. 21, 2019

(65) Prior Publication Data
US 2020/0257046 A1    Aug. 13, 2020

Related U.S. Application Data

(60) Provisional application No. 62/559,022, filed on Sep. 15, 2017.

(51) Int. Cl.
*G02B 6/02*    (2006.01)
*G02B 6/25*    (2006.01)

(52) U.S. Cl.
CPC .................................. *G02B 6/25* (2013.01)

(58) Field of Classification Search
None
See application file for complete search history.

(56) References Cited

U.S. PATENT DOCUMENTS

| 4,368,064 A | 1/1983 | Siegel |
| 4,838,643 A | 6/1989 | Hodges et al. |

(Continued)

FOREIGN PATENT DOCUMENTS

| EP | 2010/118106 | 10/2010 |
| GB | 2 162 838 A | 2/1986 |

OTHER PUBLICATIONS

Zhang et al. (CN-206367034-U), Derwent 201753989X, Aug. 2017. (Year: 2017).*

(Continued)

*Primary Examiner* — Michelle R Connelly
(74) *Attorney, Agent, or Firm* — Merchant & Gould P.C.

(57) ABSTRACT

Disclosed herein is a method for cleaving an optical fiber. The method includes providing an optical fiber (62), which is a bend-insensitive, single-mode optical fiber having a depressed index cladding layer that does not include any air inclusions. The method further includes applying energy to a section of the optical fiber (62) between a first location of the optical fiber and a second location of the optical fiber. The method also includes mechanically cleaving the optical fiber between the first and second locations of the optical fiber to provide cleaved optical fiber ends.

22 Claims, 3 Drawing Sheets

(56) References Cited

U.S. PATENT DOCUMENTS

| | | | |
|---|---|---|---|
| 7,458,734 B2 | 12/2008 | Bookbinder et al. | |
| 8,261,442 B2 | 9/2012 | Zheng | |
| 9,039,294 B2 | 5/2015 | Seng | |
| 2002/0181919 A1* | 12/2002 | Yasuda | B26D 11/00 385/134 |
| 2008/0056654 A1* | 3/2008 | Bickham | G02B 6/0365 385/124 |
| 2008/0196450 A1* | 8/2008 | Hogari | G02B 6/25 65/452 |
| 2011/0129191 A1* | 6/2011 | Bickham | G02B 6/02357 385/127 |
| 2011/0305035 A1* | 12/2011 | Bickham | C03C 25/475 362/558 |
| 2013/0319052 A1* | 12/2013 | Bansal | G02B 6/25 65/391 |
| 2014/0294355 A1 | 10/2014 | Bickham et al. | |
| 2016/0139333 A1* | 5/2016 | Zhang | G02B 6/02214 385/124 |

OTHER PUBLICATIONS

International Search Report and Written Opinion of the International Searching Authority for International Patent Application No. PCT/EP2018/074952 dated Nov. 23, 2018, 13 pages.

Vlazzarese, D., "AllWave® FLEX ZWP Single-Mode Fiber: Full Spectrum and Bend-Insensitive Fiber Optimized for FTTx and Premises Applications". OFS, 4 pages (Jun. 2006).

Mazzarese, D., "Fiber FAQs: Bend-Optimized Fiber", OFS, 10 pages (Admitted prior art as of Sep. 2017).

* cited by examiner

HEAT TREATMENT OF FIBER TO IMPROVE CLEAVING

CROSS-REFERENCE TO RELATED APPLICATION

This application a National Stage Patent Application of PCT/EP2018/074952, filed on Sep. 14, 2018, which claims the benefit of U.S. Patent Application Ser. No. 62/559,022, filed on Sep. 15, 2017, the disclosures of which are incorporated herein by reference in their entireties. To the extent appropriate, a claim of priority is made to each of the above disclosed applications.

TECHNICAL FIELD

The present disclosure relates generally to an improved method for cleaving an optical fiber.

BACKGROUND

Present day telecommunications technology utilizes, to an increasing extent, optical fibers for signal transmission. When preparing fiber optic networks, it is often necessary to join optical fibers together. Joining optical fibers can be accomplished by splicing or connectorization. In fiber optic communication, it is important to produce high quality fiber end faces in order to join optical fibers. In fiber-to-fiber connections, poor fiber end preparation leads to coupling loss.

Surface defects, such as hackle, will reflect or diffuse light causing loss. Light is reflected or scattered at the connection interface unless the connecting fiber end faces are properly prepared.

Fiber end preparation begins by removing the coating and any buffer. Thereafter, it is extremely important to cleave the fiber properly. Cleaving is the process by which an optical fiber is cut or precisely broken. Optical fiber is generally cleaved by scoring or scratching the surface and then applying tension so the glass breaks in a smooth manner. A heavy metal or diamond blade is generally used to score the fiber. Tension can be applied by pulling on the fiber or, alternatively, bending the fiber over a curved surface. However, increased tension can create more surface defects, such as hackle, during cleaving.

There are various types of optical fibers. One class of optical fibers is bend-insensitive optical fibers. Bend-insensitive optical fibers are more difficult to cleave without producing surface defects.

It is known to apply energy to hole-assisted, bend-insensitive optical fiber (a specific sub-type of bend-insensitive optical fiber) prior to cleaving. Application of energy collapses air voids in the fiber permitting better core alignment or preventing entrapment of debris in the voids during polishing of the fiber end face.

U.S. Pat. No. 7,458,734 discloses heating optical fiber prior to cleaving by, for example, an electric arc, for a time and at a temperature sufficient to collapse at least some holes in the cladding of the optical fiber. The holes may be distributed throughout the cladding or may be contained within an annular hole containing region that does not occupy the entire cladding. Collapsing the holes permits better optical sensing of the core during core alignment when splicing two optical fibers together.

U.S. Pat. No. 8,261,442 discloses a method of splicing a bend-optimized optical fiber including a mesh of nanometer-scale pockets in the cladding of the fiber. The method includes heating a section of the fiber; allowing the fiber to cool; cleaving the fiber through the section of the fiber that was heated; transmitting light through the fiber; and splicing the fiber by analyzing an image of the fiber. The heating step collapses the mesh of nanometer-scale pockets in the cladding of the fiber and aids in core alignment when splicing two fibers together.

U.S. Pat. No. 9,039,294 discloses a method for assembling a fiber optic connector. The method involves heating a section of bend-optimized fiber having cladding with a mesh of nanometer-scale air pockets; inserting said fiber into a ferrule until said fiber protrudes from said ferrule, wherein a first portion of said heated section protrudes from said ferrule and a second portion of said heated section remains within said ferrule; fixing said fiber in place in said ferrule; and polishing an end of said cleaved fiber fixed in said ferrule. The heating step collapses the air pockets and prevents debris from being trapped in the air pockets during polishing of the fiber end.

U.S. Patent Application Publication No. 2009/0199597 is directed to systems and methods of collapsing air lines in an air line-containing region of a bend-performance optical fiber that is a "nanostructure" or "holey" optical fiber. In particular, it discloses irradiating the optical fiber at a mid-span location or an end location to collapse the air lines into the adjacent cladding region and then cleaving the optical fiber at the air-line-collapsed portion to create at least one optical fiber end that has no air lines. Collapsing the air lines prevent contaminants and debris from filling the voids at the fiber end during polishing.

There is still a need for an improved cleaving process for other types of bend-insensitive optical fiber.

SUMMARY

One aspect of the present disclosure relates to a method for cleaving an optical fiber, which is a bend-insensitive, single-mode optical fiber having a depressed index cladding layer that does not include any air inclusions. The method comprises providing an optical fiber. The method further comprises applying energy to a section of the optical fiber between a first location of the optical fiber and a second location of the optical fiber. The method also comprises mechanically cleaving the optical fiber between the first and second locations of the optical fiber to provide cleaved optical fiber ends.

DETAILED DESCRIPTION

In the following detailed description, reference is made to the accompanying drawings showing by way of illustration a specific embodiment of a method disclosed herein for cleaving an optical fiber. It is to be understood that other embodiments may be utilized and structural or logical changes may be made without departing from the scope of the present disclosure. The following detailed description, therefore, is not to be taken in a limiting sense.

Aspects of the present disclosure relate to an improved method for cleaving an optical fiber that is a bend-insensitive, single-mode optical fiber having a depressed index cladding layer without any air inclusions.

Aspects of the present disclosure also relate to an improved method for cleaving such an optical fiber that produces cleaved optical fiber ends without any hackle. As used herein, the term "without any hackle" or "no hackle" refers to a hackle area of 50 Å$^2$ to 5000 nm$^2$. Some aspects of the present disclosure further relate to an improved method for cleaving such an optical fiber that reduces the amount of force necessary to cleave the optical fiber.

Disclosed herein is a method for cleaving an optical fiber. The method comprises providing an optical fiber; applying energy to a section of the optical fiber between a first location of the optical fiber and a second location of the optical fiber; and mechanically cleaving the optical fiber between the first and second locations of the optical fiber to provide cleaved optical fiber ends. In this method, the optical fiber is a bend-insensitive, single-mode optical fiber having a depressed index cladding layer. The depressed index cladding layer does not include any air inclusions.

The present inventors have unexpectedly discovered that applying energy to bend-insensitive, single-mode optical fiber having a depressed index cladding layer without any air inclusions, prior to cleaving the optical fiber, can advantageously eliminate hackle at the cleaved optical fiber ends and also, in certain instances, reduces the force necessary to cleave the optical fiber.

Figure 1A:
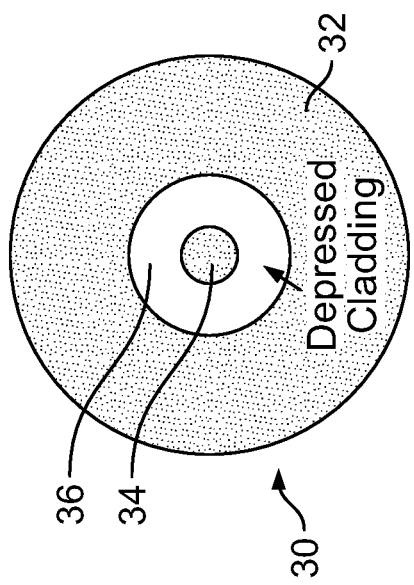
FIG. 1A is a cross-sectional view of extreme small core and small core bend-insensitive optical fiber.
Figure 1B:
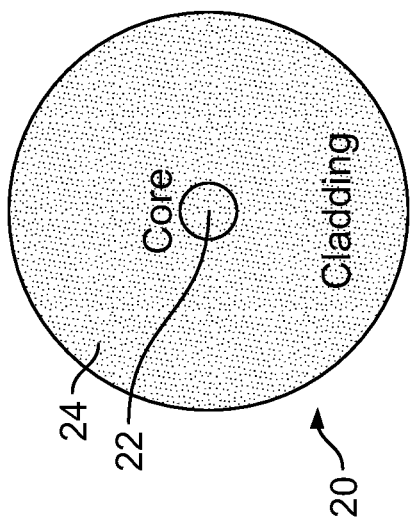
FIG. 1B is a cross-sectional view of depressed cladding, bend-insensitive optical fiber.
Figure 1C:
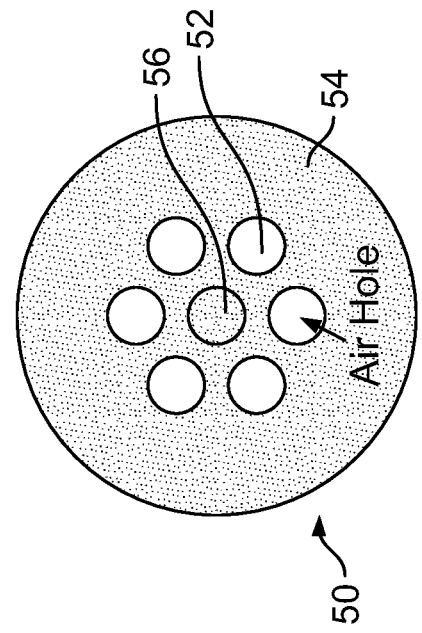
FIG. 1C is a cross-sectional view of bend-insensitive optical fiber having an annular trench region.
Figure 1D:
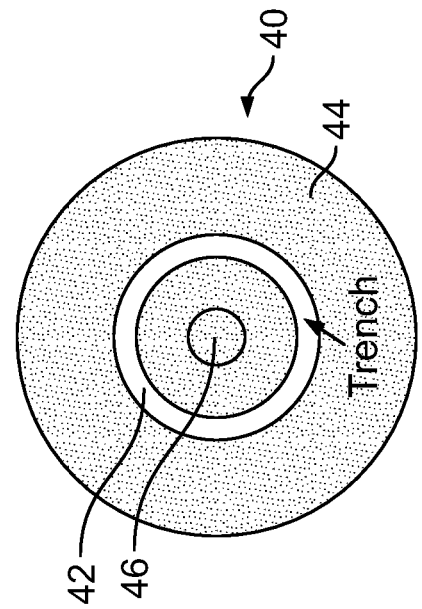
FIG. 1D is a cross-sectional view of bend-insensitive optical fiber, which is hole-assisted.

There are various types of bend-insensitive, single-mode optical fibers. They include, for example, extreme small core; small core; depressed cladding; trench-assisted; and hole-assisted. These different designs are illustrated in FIGS. 1A-1D. FIG. 1A shows extreme small core and small core optical fiber 20, which utilizes a core 22 having an increased refractive index with a reduced core diameter at the center of a cladding 24. FIG. 1B shows depressed cladding optical fiber 30, which utilizes cladding having an outer layer 32 and an inner layer 36, both having a lower refractive index as compared to the core 34. FIG. 1C shows trench-assisted optical fiber 40, which utilizes an annular trench region 42 having a low refractive index in the cladding 44 surrounding the core 46. FIG. 1D shows hole-assisted optical fiber 50, which utilizes voids 52 in the cladding 54 surrounding the core 56 to create a lower index of refraction in the cladding 54.

As used herein, the term "depressed index cladding layer" refers to a layer in the cladding having a lower index of refraction than the core's index of refraction. The depressed index cladding layer can form the entirety of the cladding (i.e., the fiber cladding is a single homogeneous layer of glass). This is sometimes referred to as "matched cladding." Alternatively, the cladding can include two separate layers: an inner cladding layer and an outer cladding layer (as shown in FIG. 1B). In this case, the cladding has two depressed index cladding layers. The refractive index of inner cladding layer is lower than the core's refractive index. The outer cladding layer surrounds the inner cladding layer and has a higher refractive index than the inner cladding layer. However, the outer cladding layer's refractive index is lower than the core's refractive index. Cladding having two separate layers is oftentimes referred to as "depressed cladding." Since the depressed index cladding layer does not include any air inclusions, the lower index of refraction is not a consequence air inclusions.

As used herein, the term "index" means refractive index.

As used herein, "single-mode" optical fiber refers to optical fibers in which light propagation is generally in a single mode. However, perfect suppression of all other modes may not always be possible. "Single-mode" optical fiber implies that the intensity of such other modes is either small or insignificant for the intended application.

Figure 2:
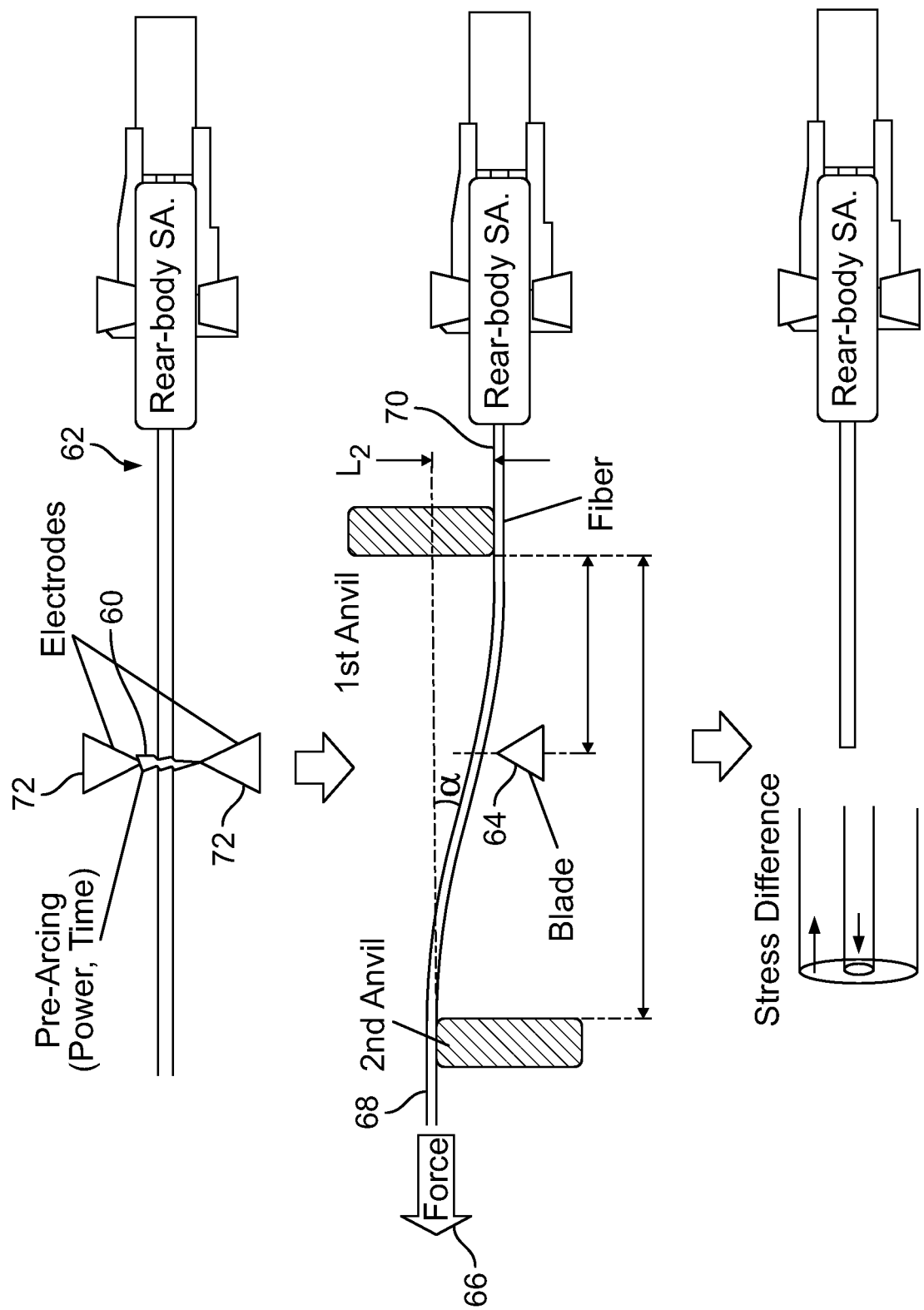
FIG. 2 depicts an exemplary method for cleaving an optical fiber as disclosed herein.

FIG. 2 illustrates an embodiment of the method disclosed herein. As shown in FIG. 2, an electric arc 60 between two electrodes 72 is applied to a section of the fiber 62. After application of the electric arc 60, the fiber 62 is cleaved at the section by first scoring the fiber 62 with a blade 64 and then applying an axial force 66 to the fiber 62. In the embodiment depicted in FIG. 2, the first and second ends 68, 70 of the fiber 62 are offset by a length $L_2$ in a direction generally perpendicular to the axis of the fiber at its first and second ends 68, 70 when applying the axial force 66 to cleave the fiber 62. Offsetting the ends of the fiber 62 cleaves the fiber at an angle α (from perpendicular to a longitudinal axis of the optical fiber).

In embodiments of the method disclosed herein, the optical fiber does not include a trench region in the cladding.

In some embodiments, the optical fiber meets ITU G.657.A2 specification. In some embodiments, the optical fiber meets ITU G.657.B3 specification.

ITU refers to the International Telecommunication Union, which is a part of the United Nations Systems of Organization. The ITU administers the commonly referenced single-mode fiber standards documents including G.657, which covers bend-insensitive single-mode optical fiber. The G.657 class is divided into Class A (for access networks) and Class B (for short distances at the end of access networks in bending-rich environments (e.g., buildings)). Class A includes G.657.A1 and G.657.A2. Class B includes G.657.B2 and B.657.B3. The sub-categories have the following minimum specified bending radii:

| Class A | Minimum Bending Radius |
| --- | --- |
| G.657.A1 | 10 mm |
| G.657.A2 | 7.5 mm |

| Class B | Minimum Bending Radius |
| --- | --- |
| G.657.B2 | 7.5 mm |
| G.657.B3 | 5 mm |

Methods and devices for mechanically cleaving optical fiber are generally known in the art. Cleaving cuts or breaks the optical fiber. Generally, the optical fiber is cleaved by scoring or scratching the surface and applying an axial load to the optical fiber. Accordingly, in an embodiment, the optical fiber is scored at a score location between the first and second locations of the optical fiber. An axial load is then applied to the optical fiber until the optical fiber breaks at the score location.

In some embodiments, the axial load is from about 1 N to about 2.5 N. In other embodiments, the axial load is from about 1 N to about 2 N. For example, the axial load can be from about 1.2 N to about 1.8 N. As another example, the axial load can be from about 1.6 N to about 1.8 N.

As explained above, applying energy prior to mechanically cleaving can reduce the axial load compared to an axial load required without pre-application of energy. In some embodiments, pre-application of energy reduces the axial load required from about 10 to about 50 percent. For example, the axial load reduction can be from about 20 percent to about 40 percent. As other examples, the axial load reduction can be from about 20 percent to about 30 percent or from about 25 percent to about 30 percent.

The optical fiber can be mechanically cleaved such that end faces of the cleaved optical fiber are perpendicular to a longitudinal axis of the optical fiber. Alternatively, the optical fiber can be mechanically cleaved at an angle from perpendicular to the longitudinal axis of the optical fiber. The angle can be from about 5 degrees to about 50 degrees. For example, the angle can be from about 5 degrees to about 15 degrees. As another example, the angle can be from about 6 degrees to about 10 degrees. In an embodiment, the angle is about 8 degrees.

The energy source can vary. The energy application step can involve placing the uncleaved fiber in a cleaving device and then exposing the section of the optical fiber between the first location and the second location to an electric arc discharge. In some embodiments, the energy is an electric arc discharge. In other embodiments, the energy is a plasma arc discharge. In yet other embodiments, the energy is from laser irradiation.

The amount of energy applied and time applied is generally sufficient to eliminate any hackle from the end face of the fiber upon cleaving. When an electric arc discharge is applied, the energy can be applied for a time period from about 120 ms to about 280 ms, for example, from about 150 ms to about 250 ms. Similarly, when an electric arc discharge is applied, it can have a voltage of about 1 kV and a current from about 5 mA to about 8 mA. As another example, the energy applied can be about 0.5 joules to about 1.2 joules.

EXAMPLES

G.657.A2 fiber and G.657.B3 fiber were each cleaved in four different experiments. The G.657.A2 fiber used was OFS AllWave® FLEX+fiber. The G.657.B3 fiber used was Allwave® FLEX MAX fiber.

Figure 3:
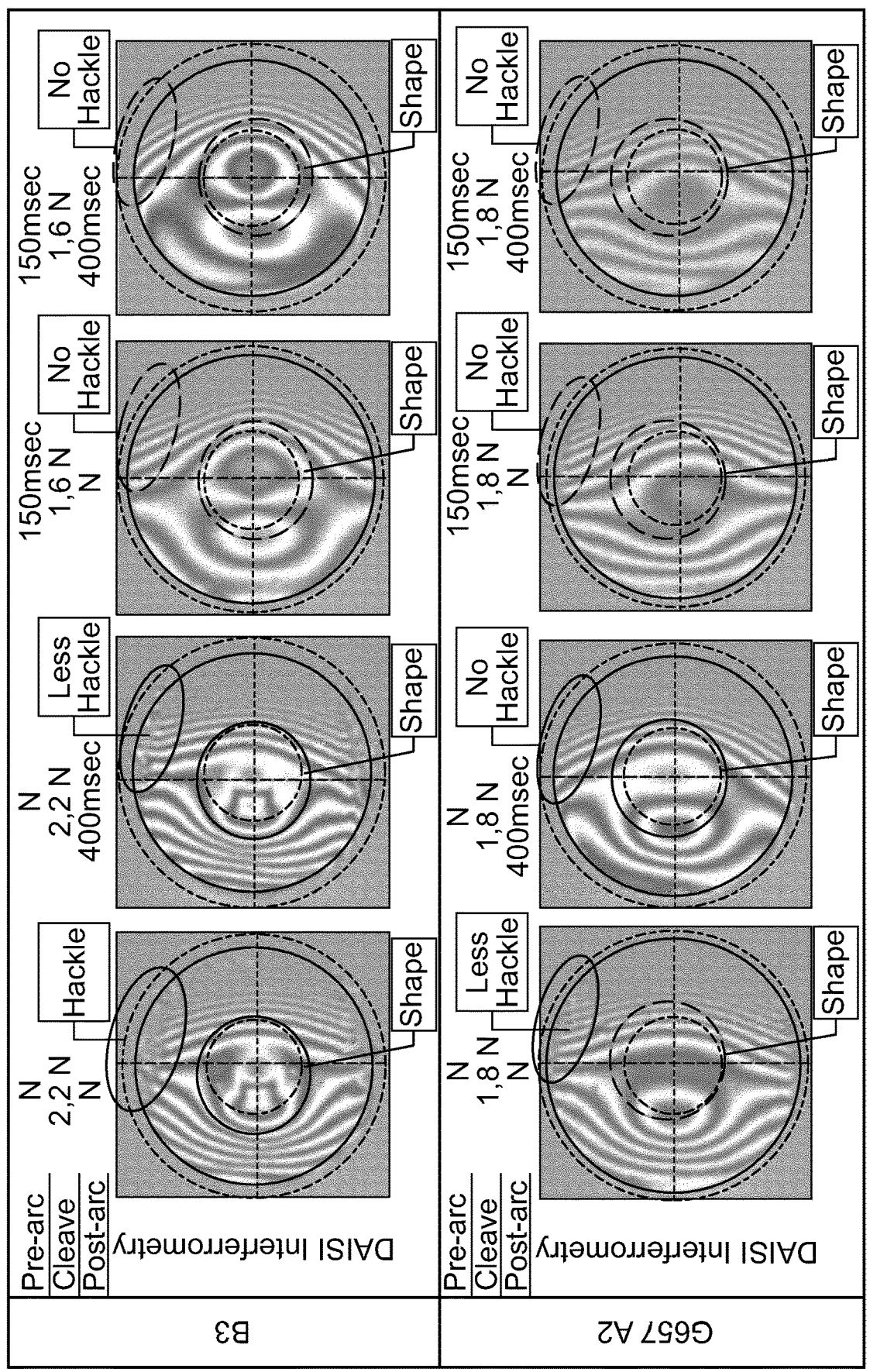
FIG. 3 shows interferometry results from cleaving a G.657.A2 fiber and a G.657.A3 fiber with (1) no pre-arcing and no post-arcing; (2) post-arcing with no pre-arcing; (3) pre-arcing with no post-arcing; and (4) both pre-arcing and post-arcing.

The first experiments cleaved the fiber under an axial load without either pre-arcing or post-arcing. The second experiments cleaved the fiber under an axial load without pre-arcing but with post-arcing (2 joules-6 joules). The third experiments cleaved the fiber under an axial load with pre-arcing (0.5 joules-1.2 joules) but without post-arcing. The fourth experiments cleaved the fiber under an axial load with both pre-arcing (0.5 joules-1.2 joules) and post-arcing (2 joules-6 joules). FIG. 3 shows interferometry results for each of these experiments. FIG. 3 also shows the cleaving force required, the duration of pre-arcing, and the duration of post-arcing.

Cleaving the fibers without any pre-arcing or post-arcing resulted in the end faces exhibiting hackle. The A2 fiber exhibited less hackle than the B3 fiber. Nevertheless, the A2 fiber exhibited some hackle.

Cleaving the fibers with post-arcing only and no pre-arcing resulted in mixed results. The B3 fiber exhibited some hackle, albeit less than without post-arcing. The A2 fiber exhibited no hackle. Of course, post-arcing could not reduce the axial load necessary for cleaving.

Cleaving the fibers with pre-arcing only and no post-arcing resulted in both the A2 and the B3 fibers exhibiting no hackle. Thus, pre-arcing was beneficial in both instances while post-arcing was not. Pre-arcing also reduced the amount of axial load necessary to cleave the B3 fiber from 2.2 N to 1.6 N (an axial load reduction of approximately 27 percent). However, pre-arcing did not reduce the amount of axial load necessary to cleave the A2 fiber. Rather, the cleaving force remained constant at 1.8 N for the A2 fiber.

Cleaving the fibers with both pre-arcing and post-arcing similarly resulted in both fibers exhibiting no hackle. Again, the pre-arcing component reduced the amount of axial load necessary to cleave the B3 fiber from 2.2 N to 1.6 N, but did not reduce the amount of axial load necessary to cleave the A2 fiber (the cleaving force remained constant at 1.8 N). Therefore, post-arcing did not provide any added benefit to pre-arcing.

From the foregoing detailed description, it will be evident that modifications and variations can be made to the method disclosed herein without departing from the spirit or scope of the disclosure.

REFERENCE LETTERS/NUMBERS angle α
length $L_2$
extreme small core and small core optical fiber 20
core 22
cladding 24
depressed cladding optical fiber 30
outer layer 32
core 34
inner layer 36
annular trench region 28
trench-assisted optical fiber 40
trench region 42
cladding 44
core 46
hole-assisted optical fiber 50
voids 52
cladding 54
core 56
electric arc 60
fiber 62
blade 64
force 66
first end 68
second end 70
electrode 72

What is claimed is:

1. A method for cleaving an optical fiber, comprising:
   providing an optical fiber, wherein the optical fiber is a bend-insensitive, single-mode optical fiber having a depressed index cladding layer;
   applying energy to a section of the optical fiber between a first location of the optical fiber and a second location of the optical fiber; and
   mechanically cleaving the optical fiber between the first and second locations of the optical fiber to provide cleaved optical fiber ends,
   wherein the depressed index cladding layer does not include any air inclusions; and
   wherein hackle is eliminated at the cleaved optical fiber ends.

2. The method of claim 1, wherein the optical fiber does not include a trench region.

3. The method of claim 1, wherein the optical fiber meets ITU G.657.A2 specification having a minimum bend radius of 7.5 mm.

4. The method of claim 1, wherein the optical fiber meets ITU G.657.B3 specification having a minimum bend radius of 5 mm.

5. The method of claim 1, wherein mechanically cleaving the optical fiber comprises applying an axial load to the optical fiber.

6. The method of claim 5, wherein the axial load is from about 1 N to about 2.5 N.

7. The method of claim 6, wherein the axial load is from about 1 N to about 2 N.

8. The method of claim 5, wherein applying energy prior to mechanically cleaving reduces the axial load compared to an axial load required without pre-application of energy.

9. The method of claim 1, wherein mechanically cleaving the optical fiber comprises scoring the optical fiber at a score location between the first and second locations of the optical fiber and applying an axial load to the optical fiber until the optical fiber breaks at the score location.

10. The method of claim 1, wherein the optical fiber is mechanically cleaved at an angle from perpendicular to a longitudinal axis of the optical fiber.

11. The method of claim 10, wherein the angle is from about 5 degrees to about 50 degrees.

12. The method of claim 11, wherein the angle is from about 5 degrees to about 15 degrees.

13. The method of claim 12, wherein the angle is from about 6 degrees to about 10 degrees.

14. The method of claim 13, wherein the angle is about 8 degrees.

15. The method of claim 10, further comprising offsetting ends of the optical fiber in order to mechanically cleave at the angle.

16. The method of claim 1, wherein the energy is an electric arc discharge.

17. The method of claim 1, wherein the energy is a plasma arc discharge.

18. The method of claim 1, wherein the energy is from laser irradiation.

19. The method of claim 1, wherein the energy is applied for a time period from about 120 ms to about 280 ms.

20. The method of claim 19, wherein the energy is applied for a time period from about 150 ms to about 250 ms.

21. The method of claim 1, wherein the energy has a voltage of about 1 kV and a current from about 5 mA to about 8 mA.

22. The method of claim 1, wherein the energy applied is about 0.5 joules to about 1.2 joules.

* * * * *